United States Patent
Komoda et al.

(10) Patent No.: US 6,298,910 B1
(45) Date of Patent: Oct. 9, 2001

(54) ALUMINUM-MADE HEAT EXCHANGER WITH BRAZED JOINT PORTION

(75) Inventors: Shuji Komoda; Hisashi Nakashima, both of Kariya; Shinichi Hamada, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/668,935

(22) Filed: Sep. 25, 2000

(30) Foreign Application Priority Data

Sep. 30, 1999 (JP) .................................................. 11-278823

(51) Int. Cl.⁷ ...................................................... F28F 19/06
(52) U.S. Cl. ........................ 165/133; 165/134.1; 165/167
(58) Field of Search .............................. 165/133, 134.1, 165/167

(56) References Cited

U.S. PATENT DOCUMENTS

| | | | | |
|---|---|---|---|---|
| 5,099,912 | * | 3/1992 | Tajima et al. | 165/133 |
| 5,292,595 | * | 3/1994 | Yamauchi et al. | 428/654 |
| 5,720,340 | * | 2/1998 | Ohara et al. | 165/133 |
| 5,744,255 | * | 4/1998 | Doko et al. | 428/654 |
| 5,979,542 | * | 11/1999 | Inoue et al. | 165/133 |

FOREIGN PATENT DOCUMENTS

| | | |
|---|---|---|
| 0 712 681 A2 | 5/1996 | (EP) . |
| 0 843 146 A2 | 5/1998 | (EP) . |
| A-6-170519 | 6/1994 | (JP) . |
| A-10-185462 | 7/1998 | (JP) . |

* cited by examiner

*Primary Examiner*—Allen Flanigan
(74) *Attorney, Agent, or Firm*—Harness, Dickey & Pierce, PLC

(57) ABSTRACT

A heat exchanger has a core portion composed of several pairs of first and second plates laminated with and brazed to one another. Each of the first and second plates is composed a core member, a brazing filler layer formed on a surface of the core member, and a sacrifice layer formed on the other surface of the core member. For instance, to form a pair of the first and second plates, the first plate is formed with a convex portion with an opening portion, and a burring portion of the second plate is inserted into the opening portion and is plastically deformed such that the sacrifice layer of the second plate closely contacts the brazing filler metal layer of the first plate. Then the first and the second plates are brazed together.

9 Claims, 5 Drawing Sheets

ALUMINUM-MADE HEAT EXCHANGER WITH BRAZED JOINT PORTION

CROSS REFERENCE TO RELATED APPLICATION

This application is based upon and claims the benefit of Japanese Patent Application No. 11-278823 filed on Sep. 30, 1999, the contents of which are incorporated herein by reference.

BACKGROUND OF THE INVENTION

1. Field of the Invention

This invention relates generally to a brazing structure of an aluminum-made heat exchanger formed by integrally brazing alternately laminating first and second metallic plates that are mainly made of aluminum, and particularly to a brazing structure of a water cooling type oil cooler capable of preventing corrosion of a passage wall on which cooling water flows as medium for cooling oil.

2. Description of the Related Art

Conventionally, there is an aluminum-made heat exchanger such as a water cooling type oil cooler for cooling engine oil (hereinafter, referred to as oil) by exchanging heat with engine cooling water. As shown in FIG. 7, such a water cooling type oil cooler is formed by integrally brazing laminated several pairs of first and second plates 101 and 102 that are formed from aluminum alloy by plastic working (pressing). For instance, one first plate 101 forms a cooling water passage 103 with a second plate 102 adjacent thereto at a lower side thereof, and forms an oil passage 104 with another second plate 102 adjacent thereto at an upper side thereof.

In this water cooling type oil cooler, cooling water deteriorates to have high corrosiveness and to easily cause pitting corrosion on the first and second plates defining the cooling water passage as passage walls, and accordingly, a lifetime of a product is shortened. To prevent the pitting corrosion of the passage walls, as shown in FIG. 7, the passage walls are clad with sacrifice corrosion layers 111, 121. Incidentally, reference numerals 105, 106 respectively indicate oil passages formed in the first and second plates by pressing. However, in the conventional water cooling type oil cooler, as shown in FIG. 7, because no brazing filler metal exists at the joint portion between the first and second plates 101, 102, the first and second plates 101, 102 cannot be bonded together by brazing.

As a countermeasure against the above problem, as shown in FIG. 8A, it is conceivable to adopt a plate composed of a base member (core member) 110 made of aluminum alloy, one surface of which is clad with sacrifice corrosion material 113 and further both surfaces of which are clad with brazing filler metal layers 114, 115. This plate is, however, accompanied by high material cost since it is composed of four layers.

As shown in FIG. 8B, it can also be conceivable to adopt a three-layered plate including the core member (core member) 110 made of aluminum alloy, both surfaces of which are clad with brazing filler metal layers 116, 117 containing Zn that can serve as a sacrifice corrosion material simultaneously. However, when this plate is integrally brazed within a heating furnace such as a vacuum furnace, Zn component is liable to evaporate and flows into a joint part of the plate. Because of this, it is difficult to control the amount of the sacrifice corrosion material covering the passage walls of the cooling water passage. This may result in insufficient corrosion resistance.

As a result, pitting corrosion may be produced on the passage walls of the cooling water passage, or the brazing filler metal layers may be corroded first to cause insufficient sealing that allows communication between the oil passage and the cooling water passage. In consequence, oil can be mixed with cooling water.

It can also be conceivable to adopt first and second plates each having a three-layered structure and joined together as shown in FIG. 9. The first and second plates are respectively composed of first and second plates 101, 102, one surface of which is clad with sacrifice corrosion material 111, 112, and the other surface of which is clad with brazing filler metal 120, 122. The three-layered first and second plates are formed by pressing (burring) processing to form, for instance, burring portions 119, 129 defining oil communication passages 105, 106 through which two oil passages 104 communicate each other.

In this oil cooler, the outer wall surface of the burring portion 129 of the second plate is brazed to the inner wall surface of the burring portion 119 of the first plate. However, it is difficult to raise accuracy of a clearance between the inner wall surface of the burring portion 119 and the outer wall surface of the burring portion 129. For instance, when the burring portion 129 is inserted into the burring portion 119 for assembling, the burring portion 119 may expand outward or bent inward to produce brazing failures at many points. The brazing failures lessen the sealing property at the joining portion between the first and second plates, and the joining strength of the oil cooler.

SUMMARY OF THE INVENTION

The present invention has been made in view of the above problems. An object of the present invention is, in an aluminum-made heat exchanger, to improve a brazing property at a joint portion between first and second plates so as to improve the sealing property and the bonding strength of the joint portion and so as to lengthen the product lifetime of the heat exchanger.

According to the present invention, a heat exchanger has a first plate and a second plate laminated with and brazed to each other in a plate thickness direction thereof to form a passage therebetween. The first plate has a first brazing filler metal layer member on a first surface thereof and a first sacrifice layer on a second surface thereof. The second plate has a second brazing filler metal layer on a first surface thereof and a second sacrifice layer on a second surface thereof. The first sacrifice layer and the second sacrifice layer face each other and define the passage as passage walls. The second plate is plastically deformed such that the first brazing filler metal layer is stacked with the second sacrifice layer at the joint portion in the plate thickness direction of the first and second plates forming the passage.

Accordingly, the first brazing filler metal layer can be interposed between the first and second plates having a three-layered structure, at the joint portion. Therefore, the first and second plates can be brazed securely, and the sealing property and the bonding strength of the joint portion are improved. In consequence, the heat exchanger can have a lengthened lifetime as a product.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENT

Figure 1:
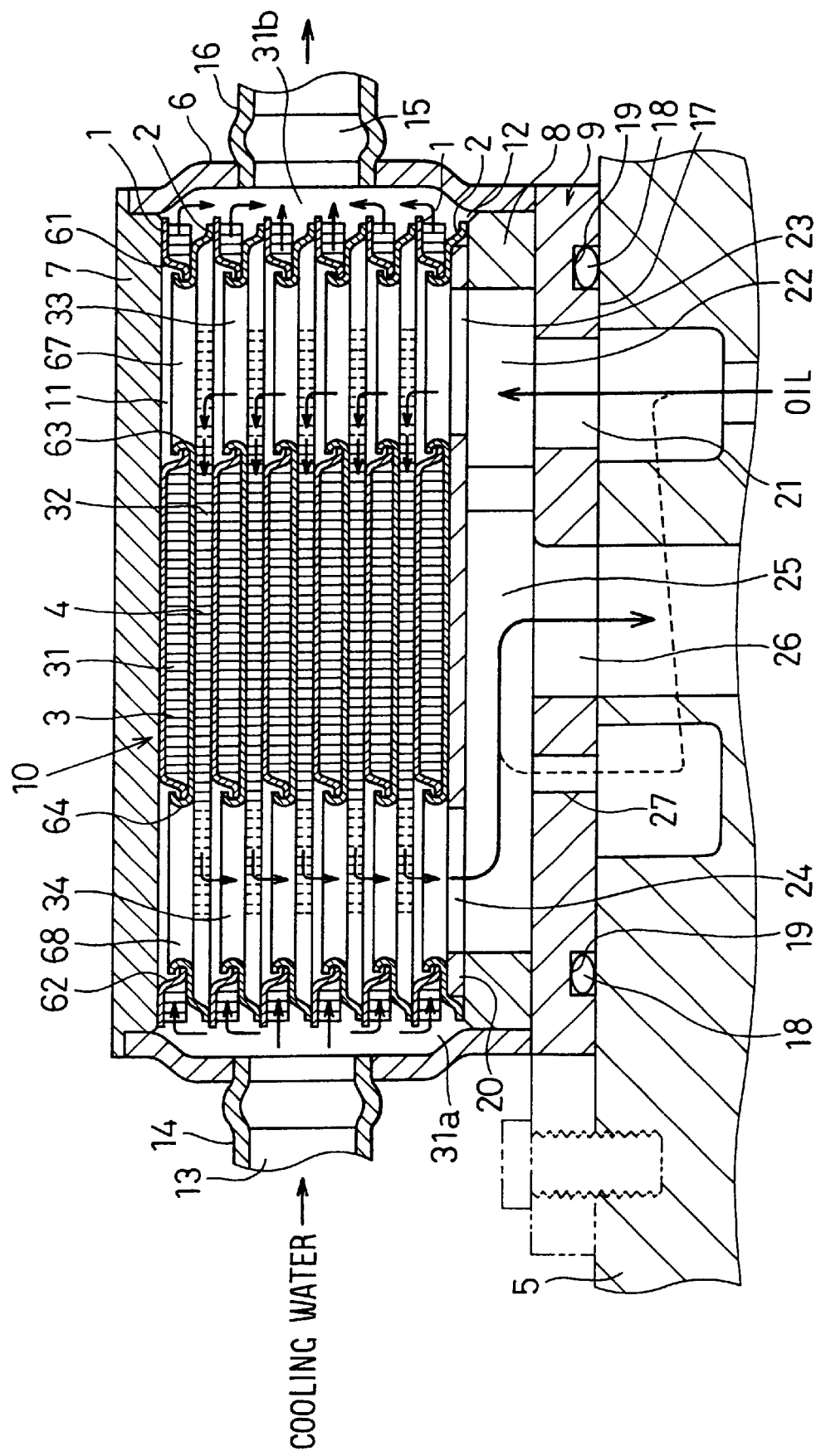
FIG. 1 is a cross-sectional view showing a water cooling type oil cooler in a preferred embodiment.

A preferred embodiment of the present invention is explained below with reference to FIGS. 1 to 4. Referring to FIG. 1, a water cooling type oil cooler according to the present embodiment is an aluminum-made heat exchanger, which is attached to a wall of a cylinder block 5 of a vehicle engine (not shown) to cool oil such as engine oil, automatic transmission oil (ATF), or power steering oil by exchanging heat between the oil and cooling water for cooling the engine.

The oil cooler has a plate lamination type core portion (lamination body) 10 for exchanging heat between oil and cooling water. The plate lamination type core portion 10 is composed of several first and second plates 1, 2 that are alternately laminated (stacked) with one another in a plate thickness direction thereof. Each of the first and second plates 1, 2 is formed to have a specific shape by pressing. A generally cylindrical casing 6 accommodates therein the core portion 10. Opening portions 11, 12 in an axial direction of the casing 6 are closed with a ceiling side disk plate 7 and a bottom side disk plate 8. An inlet pipe 14 and an outlet pipe 16 for cooling water are brazed to the cylindrical wall of the casing 6. The inlet pipe 14 defines therein an inlet 13 through which cooling water is conducted, and the outlet pipe 16 defines therein an outlet 15 from which cooling water is discharged.

A bearing surface plate 9 is brazed to the bottom side plate 8 at one surface thereof. The other surface 17 of the bearing surface plate 9 at an opposite side of bottom side plate 8 has an O-shaped groove 19 for holding an O-shaped ring 18 made of acrylic rubber. The O-shaped ring 18 seals the gap between the surface (sealing surface) 17 of the bearing surface plate 9 and the wall surface of the cylinder block 5.

A reinforcement plate 20 is interposed between the bottom side plate 8 and the core portion 10 and brazed to them. The bottom side plate 8, the bearing surface plate 9, and the reinforcement plate 20 provide therein an oil inlet 21–23 for conducting oil into the core portion 10 and an oil outlet 24–26 for discharging oil from the core portion 10. The bottom plate 8 further has a bypass hole 27 for connecting the oil inflow side and the oil outflow side of the core portion so as to allow oil to bypass the core portion 10. The bypass hole 27 has a specific diameter that prevents oil from flowing into the oil outflow side while bypassing the core portion 10 excessively.

The core portion 10 is composed of several pair of upper side plates (first plates) 1 and lower side plates (second plates) 2 that are alternately stacked with one another in the plate thickness direction thereof. Each pair of first and second plates 1, 2 forms a cooling water passage (first fluid passage) 31 there between in which cooling water flows, and forms an oil passage (second fluid passage) 32, in which oil flows, with adjacent pair of first and second plates 1, 2.

Inner fins (offset fins) 3, 4 are respectively disposed in the cooling water passage 31 and the oil passage 32 to improve the heat exchange efficiency between oil and cooling water. Reference numeral 31a, 31b indicate a cooling water inlet tank portion and a cooling water outlet tank portion, respectively. Because several oil passages 32 are stacked with one another in the plate thickness direction, oil communication passages 33, 34 are further provided to connect the inlet sides and the outlet sides of the oil passages 32. One of the first plates land adjacent one of the second plates 2 (a pair of first and second plates 1, 2) form a cooling water side passage tube at a lower side thereof, and forms an oil side passage tube with another adjacent one of the second plates 2 at an upper side thereof.

Figure 2:
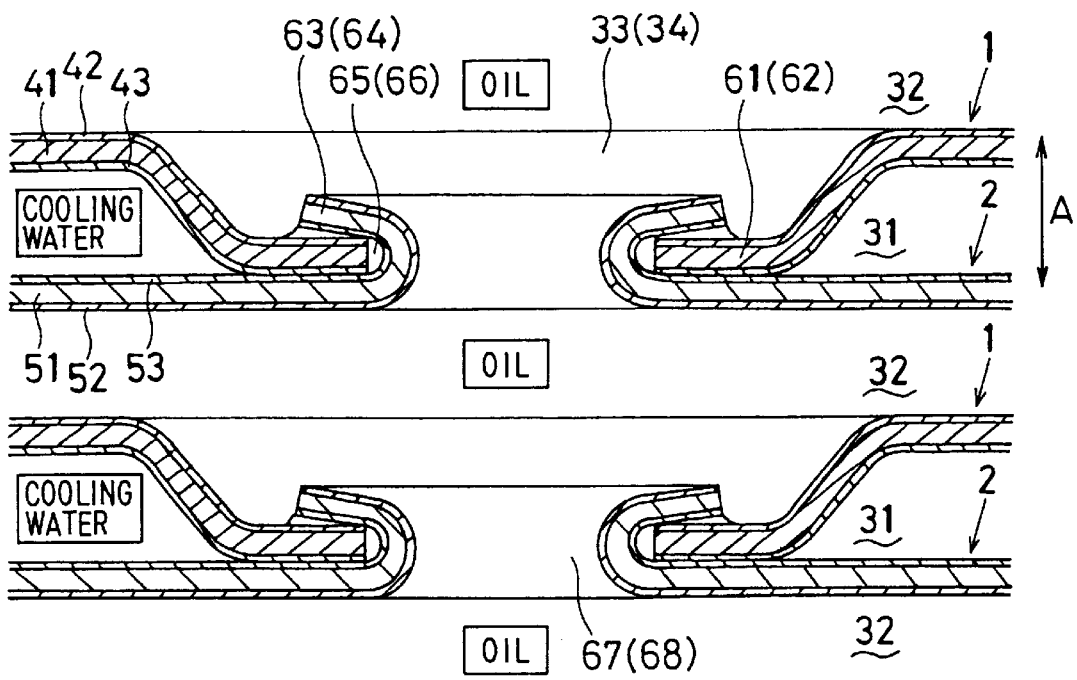
FIG. 2 is a cross-sectional view showing a joint portion between first and second plates of the oil cooler.

Here, referring to FIG. 2, each first plate 1 has a three-layered structure, and is composed of a first core member (base member) 41, one surface of which is clad with a first brazing filler metal layer 42 having a melting point lower than that of the first core member 41, and the other surface of which is clad with a first sacrifice layer 43 inferior in corrosion resistance to the first core member 41 to be corroded preceding thereto. The first sacrifice layer 43 is exposed to the cooling water passage 31 having corrosion environment harsher than that of the oil passage 32 to which the first brazing filler metal layer is exposed.

Each second plate 2 also has a three-layered structure, and is composed of a second core member (base member) 51, one surface of which is clad with a second sacrifice layer 53 inferior in corrosion resistance to the second core member 51 to be corroded preceding thereto, and the other surface of which is clad with a second brazing filler metal layer 52 having a melting point lower than that of the second core member 51.

To provide the oil communication passages 33, 34 in the first and second plates 1, 2, the first plate 1 is formed to have two convex portions (projecting portions) 61, 62 projecting toward a side in the plate thickness direction (lamination direction) indicated by arrow A in FIG. 2 by pressing (for instance, bulging, flange formation, or deep drawing). Further, the second plate 2 is formed to have two burring portions 63, 64 projecting toward an opposite side in the plate thickness direction at opening peripheral portions thereof that form the oil communication passages (opening portions) 33, 34, by burring processing.

The convex portions 61, 62 respectively form circular opening portions 65, 66, to outer walls of which the inner walls of the burring portions 63, 64 inserted into the opening portions 65, 66 and having a generally U-shaped cross-section are brazed in the plate thickness direction indicated by the arrow A. The burring portions 63, 64 respectively have burring holes 67, 68 for forming the oil communication passages 33, 34.

Next, a method for brazing the water cooling type oil cooler according to the present embodiment is explained with reference to FIGS. 1 to 3.

First, the first core member 41 is clad with first brazing filler metal on a surface thereof and the first core member 41 is clad with first sacrifice material on the other surface thereof. Accordingly, the first plate 1 in which the first brazing filler metal layer 42 is formed on the surface of the first core member 41, while the first sacrifice layer 43 is formed on the other surface of the first core member 41 is formed. Then, the first plate 1 is formed into a specific shape by pressing.

Similarly, the second core member 51 is clad with second sacrifice material on a surface thereof, and is clad with second brazing filler metal on the other surface thereof. Accordingly, the second plate 2 in which the second sacrifice layer 52 is formed on the surface of the core member 51 and the second brazing filler metal layer 52 is formed on the other surface of the core member 51 is provided. Then, the second plate 2 is formed into a specific shape by pressing.

Al—Mn system aluminum alloy (for instance, A3003) plates are used as the first and second core members 41, 51 for lightening weights and improving thermal conductivities thereof. Al—Si system aluminum alloy (for instance, A4104) brazing filler metal or Al—Si—Mg system aluminum alloy brazing filler metal is used for forming the first and second brazing filler metal layers 42, 52. Al—Zn system aluminum alloy (for instance, A7072) is used for forming the first and second sacrifice layers 43, 53.

Incidentally, cladding means, as well known, that the aluminum alloy brazing filler metal thin films for forming the first and second brazing filler metal layers 42, 52, and the aluminum alloy thin films for forming the first and second sacrifice layers 43, 53 are adhered to the surfaces of the first and second core members 41, 51 under pressure while being heated at a temperature lower than the melting points thereof.

Figure 3:
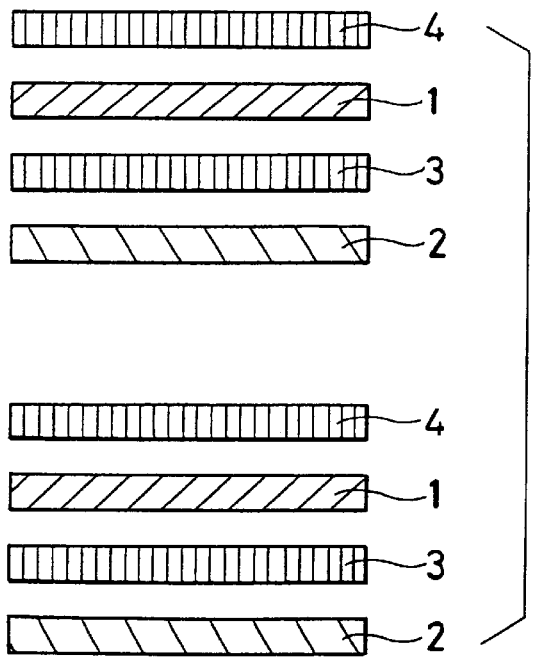
FIG. 3 is a schematic view for explaining a brazing method for forming a core portion of the oil cooler.

Then, as shown in FIGS. 1 and 3, the first and second plates 1, 2 are stacked with each other with the inner fin 3 interposed therebetween, the opening peripheral portions (burring portions) 63, 64 of the second plate 2 are respectively inserted into the opening portions 65, 66 formed in the convex portions 61, 62 of the first plate 1, and the burring portions 63, 64 are plastically deformed to expand openings thereof. Specifically, the burring portions 63, 64 are plastically deformed such that the first brazing filler metal layer 42 is stacked with and firmly contacts the second sacrifice layer 53 in the plate thickness direction, i.e., in the lamination direction.

Accordingly, as shown in FIG. 2, the outer walls of the burring portions 63, 64 of the second plate 2 are brought in direct contact with the surface of the brazing filler metal layer 42 corresponding to generally horizontal surface portions of the convex portions 61, 62 of the first plate 1 (joint portions between the first plate 1 and the second plate 2).

On the other hand, as shown in FIGS. 1 and 2, the outer peripheral portion of the first plate 1 is, at the upper side thereof, overlapped with the outer peripheral portion of the second plate 2 with the inner fin 4 interposed therebetween. Accordingly, the second brazing filler metal layer 52 of the second plate 2 is closely joined to the first brazing filler metal layer 42 of the first plate (at joint portion between the first plate 1 and the second plate 2 at the upper side of the first plate 1).

Because the opening peripheral portions of the first and second plates 1, 2 are caulked in the lamination direction of the plates 1, 2, the inner fin 3 can closely contact the inner walls of the first and second plates 1, 2 to improve the brazing performance. The plate lamination type core portion 10 before brazing can be assembled with the first and second plates 1, 2, alternately laminated (stacked) one anther in the plate thickness direction as described above. The reinforcement plate 20 is then attached to the bottom side of the core portion 10.

Next, the core portion 10 before brazing is inserted into the generally cylindrical casing 6. Then, the opening portions 11, 12 in the axial direction of the casing 6 are closed with the disk like ceiling side plate 7 and the bottom side plate 8, and the baring surface plate 9 is attached to the bottom side plate 8.

Next, the assembled member composed of the core portion 10, the reinforcement plate 20, the casing 6, the ceiling side plate 7, the bottom side plate 8, and the bearing surface plate 9 is put in a furnace such as a vacuum furnace, and is brazed together at a brazing temperature higher than the melting points of the first and second brazing filler metal layers 42, 52. Flux (solvent) may be used such that the first and second brazing filler metals can easily extend at the joint portions between the first and second plates 1, 2.

During the brazing, especially in the core portion 10, as shown in FIG. 2, the first brazing filler metal flows from the first brazing filler metal layer 42 into the joint portions between the first plate 1 and the second plate 2 due to a surface tension. Therefore, the first and second plates 1, 2 are securely bonded together by brazing at the joint portions. That is, the first brazing filler metal layer 42 of the first plate 1 is securely brazed to the second sacrifice layer 53 of the second plate 2, and is securely brazed to the second brazing filler metal layer 52 of the second plate 2 disposed at the upper side of the first plate 2.

The first brazing filler metal further flows from the first brazing filler metal layer 42 to invade into a gap between the first sacrifice layer 43 of the first plate 1 and the second sacrifice layer 53 of the second plate 2, and is mixed with the first and second sacrifice materials of the first and second sacrifice layers 43, 53. Accordingly, the electric potentials of the first and second sacrifice layers 43, 53 are increased as compared to the initial potentials thereof, so that the preceding corrosion can be prevented at this region.

As described above, according to the water cooling type oil cooler of the present embodiment, even when the core portion 10 uses the first and second plates 1, 2 each having a three-layered structure composed of the first (second) core member 41 (51), the first (second) brazing filler metal layer 42 (52), and the first (second) sacrifice layer 43 (53), the first and second plates 1, 2 are brazed together while intervening the first brazing filler metal layer 42 (first brazing filler metal) at the joint portions therebetween. Accordingly, the first and second plates 1, 2 can be securely bonded together at the joint portions where the first brazing filler metal layer 42 of the first plate 1 is securely brazed to the second sacrifice layer 53 of the second plate 2, while respectively having the first and second sacrifice layers 43, 53 exposed to a corrosion environment.

Therefore, the brazing property at the joint portions between the first and second plates 1, 2 can be improved while keeping the corrosion resistance of the first and second plates 1, 2 made of the aluminum alloy plates. Consequently, the lifetime of the water cooling type oil cooler as a product is lengthened, and sealing property and bonding strength at the joint portions between the first and second plates 1, 2 can be improved.

Figure 4:
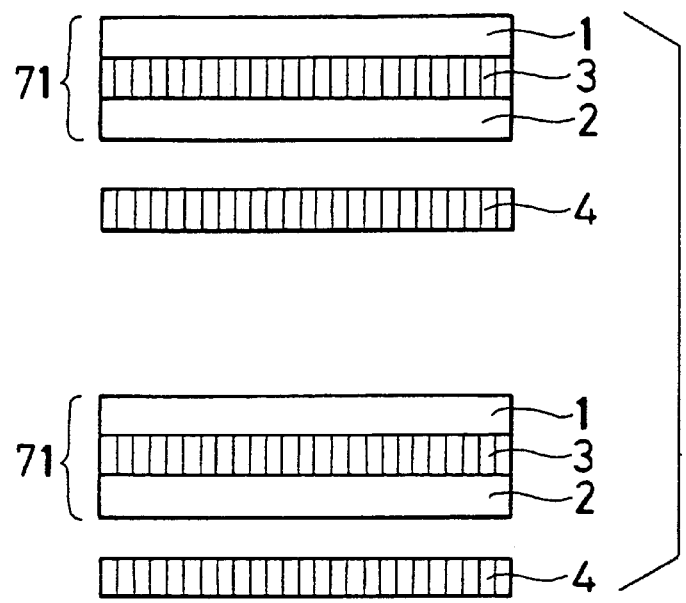
FIG. 4 is a schematic view for explaining another brazing method for forming the core portion of the oil cooler.

Here, in the present embodiment, as shown in FIG. 3, the water side inner fin 3 is sandwiched between the first plate 1 and the lower side second plate 2 at the cooling water side, and the oil side inner fin 4 is sandwiched between the first plate 1 and the upper side second plate 2 at the oil side. By repeating this arrangement, several pairs of the first and second plates 1, 2, and the several inner fins 3, 4 are stacked with one another in the plate thickness direction to assemble the core portion 10 before brazing. However, as shown in FIG. 4, several cooling water side passage tubes 71 each of which is composed of the first and second plates 1, 2 and the inner fin 3 interposed between them may formed with a necessary number, and the cooling water side passage tubes 71 and the oil side inner fins 4 may be stacked with one another alternately to form the core portion 10 before brazing.

Also, even if deteriorated cooling water having high corrosiveness flows in the cooling water passage 31, since the first and second sacrifice layers 43, 53 are corroded in preference to the first and second core members 41, 51, the core members 41, 51 are difficult to be corroded. Thus, since the corrosion of the first and second core members 41, 51 can be prevented, the cooing water passage 31 does not communicate with the oil passage 31 (by pits, for instance). Mixture of oil and cooling water and leakage of cooling water are also prevented.

While the present embodiment is explained using the example in which the water cooling type oil cooler is attached to the wall surface of the cylinder block 5 of the vehicle engine, the water cooling type oil cooler may be attached to a wall surface of a crankcase or a transmission body. Further, the present invention may be applied to a plate lamination type core portion of an oil filter integrated type oil cooler. The aluminum-made heat exchanger according to the present invention may be applied to a plate lamination type core portion of an aluminum-made radiator or a heater core for exchanging heat between cooling water and air.

Figure 5:
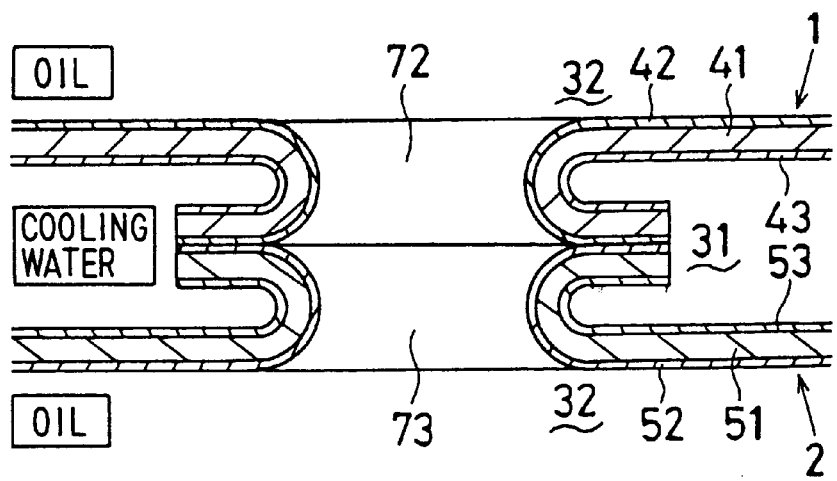
FIG. 5 is a cross-sectional view showing a joint portion between first and second plates in a modified embodiment.

As shown in FIG. 5, the first and second plates 1, 2 may be stacked with one another with opening peripheral portions, ends of which are plastically deformed toward the cooling water passage side such that the first and second brazing filler metal layers 42, 52 directly contact each other at the joint portions. Accordingly, the opening peripheral portions form oil communication passages 72, 73 and annular flange portions projecting the cooling water passage side are provided at the joint portions.

Figure 6:
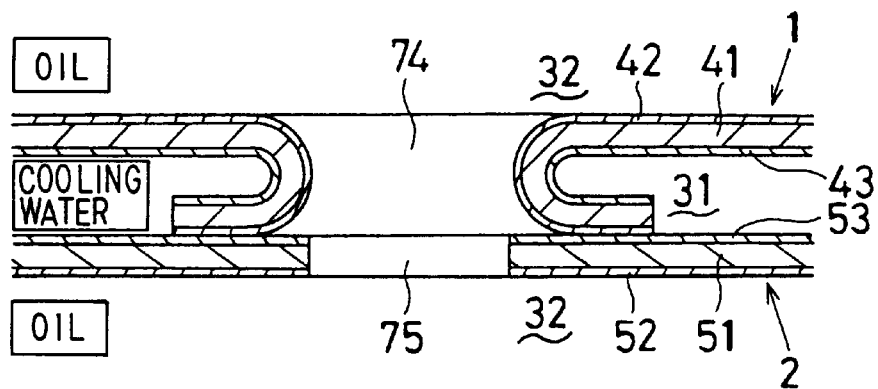
FIG. 6 is a cross-sectional view showing a joint portion between first and second plates in another modified embodiment.
Figure 7:
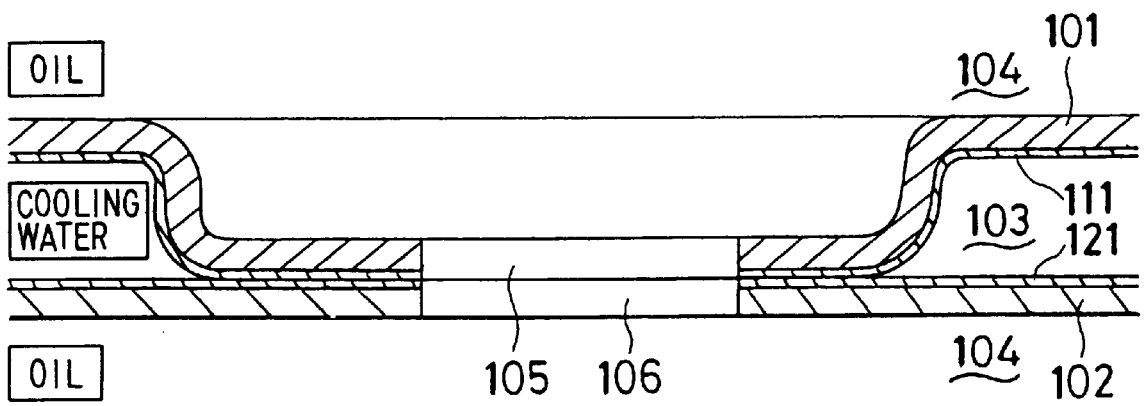
FIG. 7 is a cross-sectional view showing a joint portion between first and second plates according to a prior art.
Figure 8A:
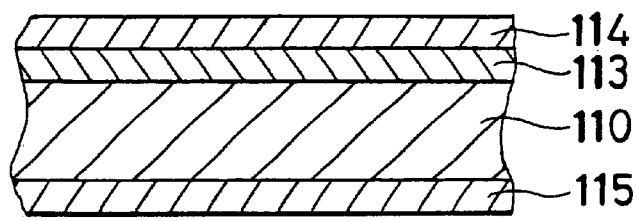
FIGS. 8A and 8B are cross-sectional view showing plates according to prior arts.
Figure 8B:
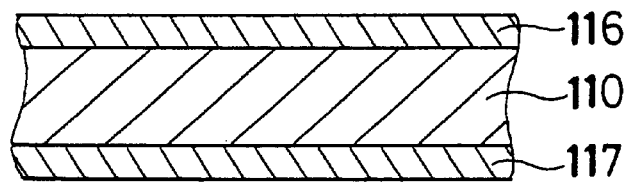
Figure 9:
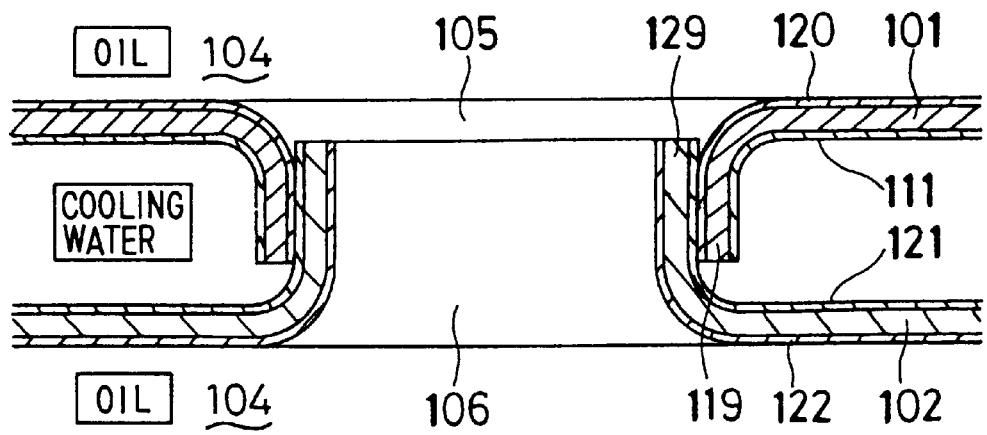
FIG. 9 is a cross-sectional view showing a joint portion between first and second plates according to a prior art.

Also, as shown in FIG. 6, only the opening peripheral portion of the first plate 1 may be plastically deformed such that the first brazing filler metal layer 42 is directly bonded to the second sacrifice layer 53 and the communication passage 74 is provided. That is, a flat plate having the oil communication passage (opening portion) 75 shown in FIG. 6 may be used as the second plate 2. The second plate 2 can be formed with the opening portion 75 by pressing, without undergoing plastic deformation.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A heat exchanger comprising:
a first plate made of aluminum material and having a first brazing filler metal layer on a first surface thereof and a first sacrifice layer on a second surface thereof, the first brazing filler metal layer having a melting point lower than that of the first plate, the first sacrifice layer having a corrosion resistance inferior to that of the first plate; and a second plate made of aluminum material and having a second brazing filler metal layer on a first surface thereof, and a second sacrifice layer on a second surface thereof, the second brazing filler metal layer having a melting point lower than that of the second plate, the second sacrifice layer having a corrosion resistance inferior to that of the second plate, wherein:
the second plate is laminated with the first plate in a plate thickness direction of the first and second plates, and is brazed to the first plate at a joint portion to form a passage therebetween with the first sacrifice layer and the second sacrifice layer facing each other and defining the passage as passage walls; and
the second plate is plastically deformed such that the first brazing filler metal layer is laminated with the second sacrifice layer at the joint portion in the plate thickness direction of the first and second plates forming the passage.

2. The heat exchanger according to claim 1, wherein the first plate is plastically deformed such that the first brazing filler metal layer is laminated with the second brazing filler metal layer in the plate thickness direction at the joint portion.

3. The heat exchanger according to claim 1, wherein:
the first plate has an opening portion;
the second plate has a burring portion that is inserted into the opening portion and is plastically deformed to have a generally U-shaped cross-section; and
the joint portion is composed a peripheral portion of the opening portion and the burring portion.

4. The heat exchanger according to claim 1, wherein:
the first surfaces of the first plate and the second plate are respectively clad with the first brazing filler metal layer and the second brazing filler metal layer; and
the second surfaces of the first plate and the second plate are respectively clad with the first sacrifice layer and the second sacrifice layer.

5. The heat exchanger according to claim 1, wherein:
the first plate forms the passage with the second plate as a first fluid passage in which a first fluid flows, and forms a second fluid passage, in which a second fluid flows, at an opposite side of the second plate; and
the first sacrifice layer is exposed to the first fluid passage having a corrosion environment harsher than that of the second fluid passage to which the first brazing filler metal layer is exposed.

6. The heat exchanger according to claim 5, wherein:
the first fluid flowing in the first fluid passage is cooling water for cooling a vehicle engine; and
the second fluid flowing in the second fluid passage is oil that is one of engine oil, transmission oil, power steering oil.

7. The heat exchanger according to claim 1, wherein the plate thickness direction of the first plate and the second plate forming the passage is approximately parallel to a plate thickness direction of the second plate forming the joint portion.

8. A heat exchanger comprising:
a first plate composed of a first core member made of aluminum material, a first brazing filler metal layer provided on a first surface of the first core member with a melting point lower than that of the first core member, and a first sacrifice layer provided on a second surface of the first core member with a corrosion resistance inferior to that of the first core member; and a second plate composed of a second core member made of aluminum material, a second brazing filler metal layer provided on a first surface of the second core member with a melting point lower than that of the second core member, and a second sacrifice layer provided on a second surface of the second core member with a corrosion resistance inferior to that of the second core member, wherein:

the first plate is stacked with the second plate in a lamination direction of the first plate to form a fluid passage therebetween, and joined to the second plate at a joint portion;

the first brazing filler metal layer of the first plate is stacked with and directly brazed to the second plate in the lamination direction at the joint portion;

the first plate has a generally U-shaped edge portion forming the joint portion; and the first brazing filler metal layer is directly brazed to the second sacrifice layer at the joint portion.

9. The heat exchanger according to claim 8, wherein the first sacrifice layer and the second sacrifice layer are exposed to the fluid passage as passage walls.

* * * * *